(12) United States Patent
Whitesides et al.

(10) Patent No.: US 7,839,564 B2
(45) Date of Patent: Nov. 23, 2010

(54) COMPONENTS AND METHODS FOR USE IN ELECTRO-OPTIC DISPLAYS

(75) Inventors: Thomas H. Whitesides, Somerville, MA (US); Richard J. Paolini, Jr., Framingham, MA (US); Michael D. Walls, Dorchester, MA (US); Seungman Sohn, Seoul (KR); Michael D. McCreary, Acton, MA (US); Guy M. Danner, Somerville, MA (US); Charles Howie Honeyman, Roslindale, MA (US); Gregg M. Duthaler, Needham, MA (US); Michael L. Steiner, New Richmond, WI (US); John E. Ritter, Westford, MA (US)

(73) Assignee: E Ink Corporation, Cambridge, MA (US)

( * ) Notice: Subject to any disclaimer, the term of this patent is extended or adjusted under 35 U.S.C. 154(b) by 741 days.

(21) Appl. No.: 11/550,114

(22) Filed: Oct. 17, 2006

(65) Prior Publication Data

US 2007/0109219 A1    May 17, 2007

Related U.S. Application Data

(63) Continuation-in-part of application No. 10/605,024, filed on Sep. 2, 2003, now Pat. No. 7,561,324.

(60) Provisional application No. 60/319,516, filed on Sep. 3, 2002, provisional application No. 60/596,743, filed on Oct. 18, 2005, provisional application No. 60/596,799, filed on Oct. 21, 2005.

(51) Int. Cl.
*G02F 1/29* (2006.01)
*G02F 1/03* (2006.01)
*G02F 1/07* (2006.01)
*G02B 26/00* (2006.01)

(52) U.S. Cl. ............ 359/315; 359/245; 359/242; 359/296

(58) Field of Classification Search ............ 359/296, 359/315, 316, 321, 322, 245, 242, 252, 253
See application file for complete search history.

(56) References Cited

U.S. PATENT DOCUMENTS 3,391,014 A    7/1968    Fauser (Continued)

FOREIGN PATENT DOCUMENTS

EP    1 099 207 B1    3/2002

(Continued)

OTHER PUBLICATIONS

Amundson, K., "Electrophoretic Imaging Films for Electronic Paper Displays" in Crawford, G. ed. Flexible Flat Panel Displays, John Wiley & Sons, Ltd., Hoboken, NJ: 2005.

(Continued)

*Primary Examiner*—Ricky L Mack
*Assistant Examiner*—Brandi N Thomas
(74) *Attorney, Agent, or Firm*—David J. Cole

(57) ABSTRACT

An electro-optic display comprises, in order, a backplane comprising a plurality of pixel electrodes; a layer of a solid electro-optic medium; a main adhesive layer; and at least one of a light-transmissive protective layer and a light-transmissive electrically-conductive layer. The electro-optic layer may be in direct contact with the backplane or separated therefrom by a thin auxiliary layer of adhesive. The main adhesive layer may be colored to provide a color filter array. An inverted front plane laminate useful in forming such a display comprises the same layers except that the backplane is replaced by a release sheet. The display combines good low temperature performance and good resolution at higher temperatures.

26 Claims, 4 Drawing Sheets

U.S. PATENT DOCUMENTS

| | | | |
|---|---|---|---|
| 3,668,106 A | 6/1972 | Ota |
| 3,756,693 A | 9/1973 | Ota |
| 3,767,392 A | 10/1973 | Ota |
| 3,772,013 A | 11/1973 | Wells |
| 3,792,308 A | 2/1974 | Ota |
| 3,870,517 A | 3/1975 | Ota et al. |
| 3,892,568 A | 7/1975 | Ota |
| 3,959,906 A | 6/1976 | Norris, Jr. et al. |
| 4,093,534 A | 6/1978 | Carter et al. |
| 4,160,257 A | 7/1979 | Carrish |
| 4,272,596 A | 6/1981 | Harbour et al. |
| 4,418,346 A | 11/1983 | Batchelder |
| 4,522,472 A | 6/1985 | Liebert et al. |
| 4,550,982 A | 11/1985 | Hirai |
| 4,602,263 A | 7/1986 | Borror et al. |
| 4,655,897 A | 4/1987 | DiSanto et al. |
| 4,681,403 A | 7/1987 | Te Velde et al. |
| 4,703,573 A | 11/1987 | Montgomery et al. |
| 4,742,345 A | 5/1988 | DiSanto et al. |
| 4,746,917 A | 5/1988 | DiSanto et al. |
| 4,902,108 A | 2/1990 | Byker |
| 5,250,938 A | 10/1993 | DiSanto et al. |
| 5,276,438 A | 1/1994 | DiSanto et al. |
| 5,288,433 A | 2/1994 | Stevens |
| 5,293,528 A | 3/1994 | DiSanto et al. |
| 5,378,404 A | 1/1995 | Han et al. |
| 5,402,145 A | 3/1995 | DiSanto et al. |
| 5,412,398 A | 5/1995 | DiSanto et al. |
| 5,467,107 A | 11/1995 | DiSanto et al. |
| 5,484,292 A | 1/1996 | McTaggart |
| 5,485,176 A | 1/1996 | Ohara et al. |
| 5,548,282 A | 8/1996 | Escritt et al. |
| 5,561,443 A | 10/1996 | DiSanto et al. |
| 5,706,134 A * | 1/1998 | Konno et al. ............... 359/599 |
| 5,745,094 A | 4/1998 | Gordon, II et al. |
| 5,760,761 A | 6/1998 | Sheridon |
| 5,777,782 A | 7/1998 | Sheridon |
| 5,800,950 A | 9/1998 | Hirao et al. |
| 5,808,783 A | 9/1998 | Crowley |
| 5,825,526 A | 10/1998 | Bommarito et al. |
| 5,872,552 A | 2/1999 | Gordon, II et al. |
| 5,930,026 A | 7/1999 | Jacobson et al. |
| 5,961,804 A | 10/1999 | Jacobson et al. |
| 6,017,584 A | 1/2000 | Albert et al. |
| 6,025,896 A | 2/2000 | Hattori et al. |
| 6,054,071 A | 4/2000 | Mikkelsen, Jr. |
| 6,055,091 A | 4/2000 | Sheridon et al. |
| 6,067,185 A | 5/2000 | Albert et al. |
| 6,097,531 A | 8/2000 | Sheridon |
| 6,105,290 A | 8/2000 | Coates et al. |
| 6,117,368 A | 9/2000 | Hou |
| 6,118,426 A | 9/2000 | Albert et al. |
| 6,120,588 A | 9/2000 | Jacobson |
| 6,120,839 A | 9/2000 | Comiskey et al. |
| 6,124,851 A | 9/2000 | Jacobson |
| 6,128,124 A | 10/2000 | Silverman |
| 6,130,773 A | 10/2000 | Jacobson et al. |
| 6,130,774 A | 10/2000 | Albert et al. |
| 6,137,467 A | 10/2000 | Sheridon et al. |
| 6,144,361 A | 11/2000 | Gordon, II et al. |
| 6,147,791 A | 11/2000 | Sheridon |
| 6,151,153 A | 11/2000 | Bryan |
| 6,172,798 B1 | 1/2001 | Albert et al. |
| 6,177,921 B1 | 1/2001 | Comiskey et al. |
| 6,184,856 B1 | 2/2001 | Gordon, II et al. |
| 6,204,953 B1 | 3/2001 | Zieba et al. |
| 6,225,971 B1 | 5/2001 | Gordon, II et al. |
| 6,232,950 B1 | 5/2001 | Albert et al. |
| 6,241,921 B1 | 6/2001 | Jacobson et al. |
| 6,249,271 B1 | 6/2001 | Albert et al. |
| 6,252,564 B1 | 6/2001 | Albert et al. |
| 6,262,706 B1 | 7/2001 | Albert et al. |
| 6,262,833 B1 * | 7/2001 | Loxley et al. ............... 359/296 |
| 6,271,823 B1 | 8/2001 | Gordon, II et al. |
| 6,300,932 B1 | 10/2001 | Albert |
| 6,301,038 B1 | 10/2001 | Fitzmaurice et al. |
| 6,312,304 B1 | 11/2001 | Duthaler et al. |
| 6,312,971 B1 | 11/2001 | Amundson et al. |
| 6,323,989 B1 | 11/2001 | Jacobson et al. |
| 6,327,072 B1 | 12/2001 | Comiskey et al. |
| 6,330,054 B1 | 12/2001 | Ikami |
| 6,337,761 B1 | 1/2002 | Rogers et al. |
| 6,376,828 B1 | 4/2002 | Comiskey |
| 6,377,387 B1 | 4/2002 | Duthaler et al. |
| 6,392,785 B1 | 5/2002 | Albert et al. |
| 6,392,786 B1 | 5/2002 | Albert |
| 6,400,492 B1 | 6/2002 | Morita et al. |
| 6,413,790 B1 | 7/2002 | Duthaler et al. |
| 6,422,687 B1 | 7/2002 | Jacobson |
| 6,445,374 B2 | 9/2002 | Albert et al. |
| 6,445,489 B1 | 9/2002 | Jacobson et al. |
| 6,459,418 B1 | 10/2002 | Comiskey et al. |
| 6,473,072 B1 | 10/2002 | Comiskey et al. |
| 6,480,182 B2 | 11/2002 | Turner et al. |
| 6,498,114 B1 | 12/2002 | Amundson et al. |
| 6,504,524 B1 | 1/2003 | Gates et al. |
| 6,506,438 B2 | 1/2003 | Duthaler et al. |
| 6,512,354 B2 | 1/2003 | Jacobson et al. |
| 6,515,649 B1 | 2/2003 | Albert et al. |
| 6,515,790 B2 | 2/2003 | Miyamoto et al. |
| 6,518,949 B2 | 2/2003 | Drzaic |
| 6,521,489 B2 | 2/2003 | Duthaler et al. |
| 6,531,997 B1 | 3/2003 | Gates et al. |
| 6,535,197 B1 | 3/2003 | Comiskey et al. |
| 6,538,801 B2 | 3/2003 | Jacobson et al. |
| 6,545,291 B1 | 4/2003 | Amundson et al. |
| 6,580,545 B2 | 6/2003 | Morrison et al. |
| 6,639,578 B1 | 10/2003 | Comiskey et al. |
| 6,652,075 B2 | 11/2003 | Jacobson |
| 6,657,772 B2 | 12/2003 | Loxley |
| 6,661,563 B2 | 12/2003 | Hayahi et al. |
| 6,664,944 B1 | 12/2003 | Albert et al. |
| 6,671,030 B2 | 12/2003 | Gyoda |
| D485,294 S | 1/2004 | Albert |
| 6,672,921 B1 | 1/2004 | Liang et al. |
| 6,680,517 B2 | 1/2004 | Namba |
| 6,680,725 B1 | 1/2004 | Jacobson |
| 6,683,333 B2 | 1/2004 | Kazlas et al. |
| 6,693,620 B1 | 2/2004 | Herb et al. |
| 6,704,133 B2 | 3/2004 | Gates et al. |
| 6,710,540 B1 | 3/2004 | Albert et al. |
| 6,721,083 B2 | 4/2004 | Jacobson et al. |
| 6,723,392 B1 | 4/2004 | Jinnai et al. |
| 6,724,519 B1 | 4/2004 | Comiskey et al. |
| 6,727,881 B1 | 4/2004 | Albert et al. |
| 6,731,367 B1 | 5/2004 | Saitoh |
| 6,738,050 B2 | 5/2004 | Comiskey et al. |
| 6,750,473 B2 | 6/2004 | Amundson et al. |
| 6,750,844 B2 | 6/2004 | Nakanishi |
| 6,753,999 B2 | 6/2004 | Zehner et al. |
| 6,788,449 B2 | 9/2004 | Liang et al. |
| 6,816,147 B2 | 11/2004 | Albert |
| 6,819,471 B2 | 11/2004 | Amundson et al. |
| 6,822,782 B2 | 11/2004 | Honeyman et al. |
| 6,825,068 B2 | 11/2004 | Denis et al. |
| 6,825,829 B1 | 11/2004 | Albert et al. |
| 6,825,970 B2 | 11/2004 | Goenaga et al. |
| 6,831,769 B2 * | 12/2004 | Holman et al. ............... 359/296 |
| 6,839,158 B2 | 1/2005 | Albert et al. |
| 6,842,167 B2 | 1/2005 | Albert et al. |
| 6,842,279 B2 | 1/2005 | Amundson |
| 6,842,657 B1 | 1/2005 | Drzaic et al. |
| 6,845,184 B1 | 1/2005 | Yoshimura et al. |
| 6,859,247 B2 | 2/2005 | Murade et al. |

| | | |
|---|---|---|
| 6,864,875 B2 | 3/2005 | Drzaic et al. |
| 6,865,010 B2 | 3/2005 | Duthaler et al. |
| 6,866,760 B2 | 3/2005 | Paolini, Jr. et al. |
| 6,870,657 B1 | 3/2005 | Fitzmaurice et al. |
| 6,870,661 B2 | 3/2005 | Pullen et al. |
| 6,891,672 B2 | 5/2005 | Whitehead et al. |
| 6,900,851 B2 | 5/2005 | Morrison et al. |
| 6,922,276 B2 | 7/2005 | Zhang et al. |
| 6,950,220 B2 | 9/2005 | Abramson et al. |
| 6,958,848 B2 | 10/2005 | Cao et al. |
| 6,967,640 B2 | 11/2005 | Albert et al. |
| 6,980,196 B1 | 12/2005 | Turner et al. |
| 6,982,178 B2 | 1/2006 | LeCain et al. |
| 6,987,603 B2 | 1/2006 | Paolini, Jr. et al. |
| 6,995,550 B2 | 2/2006 | Jacobson et al. |
| 7,002,728 B2 | 2/2006 | Pullen et al. |
| 7,012,583 B2 | 3/2006 | Toro-Lira et al. |
| 7,012,600 B2 | 3/2006 | Zehner et al. |
| 7,012,735 B2 | 3/2006 | Honeyman et al. |
| 7,023,420 B2 | 4/2006 | Comiskey et al. |
| 7,030,412 B1 | 4/2006 | Drzaic et al. |
| 7,030,854 B2 | 4/2006 | Baucom et al. |
| 7,034,783 B2 | 4/2006 | Gates et al. |
| 7,038,655 B2 | 5/2006 | Herb et al. |
| 7,061,663 B2 | 6/2006 | Cao et al. |
| 7,071,913 B2 | 7/2006 | Albert et al. |
| 7,075,502 B1 | 7/2006 | Drzaic et al. |
| 7,075,703 B2 | 7/2006 | O'Neil et al. |
| 7,079,305 B2 | 7/2006 | Paolini, Jr. et al. |
| 7,106,296 B1 | 9/2006 | Jacobson |
| 7,109,968 B2 | 9/2006 | Albert et al. |
| 7,110,163 B2 | 9/2006 | Webber et al. |
| 7,110,164 B2 | 9/2006 | Paolini, Jr. et al. |
| 7,116,318 B2 | 10/2006 | Amundson et al. |
| 7,116,466 B2 | 10/2006 | Whitesides et al. |
| 7,119,772 B2 | 10/2006 | Amundson et al. |
| 7,148,128 B2 | 12/2006 | Jacobson |
| 7,167,155 B1 | 1/2007 | Albert et al. |
| 7,170,670 B2 | 1/2007 | Webber |
| 7,173,752 B2 | 2/2007 | Doshi et al. |
| 7,176,880 B2 | 2/2007 | Amundson et al. |
| 7,180,649 B2 | 2/2007 | Morrison et al. |
| 7,190,008 B2 | 3/2007 | Amundson et al. |
| 7,193,625 B2 | 3/2007 | Danner et al. |
| 7,202,847 B2 | 4/2007 | Gates |
| 7,202,991 B2 | 4/2007 | Zhang et al. |
| 7,206,119 B2 | 4/2007 | Honeyman et al. |
| 7,223,672 B2 | 5/2007 | Kazlas et al. |
| 7,230,750 B2 | 6/2007 | Whitesides et al. |
| 7,230,751 B2 | 6/2007 | Whitesides et al. |
| 7,236,290 B1 | 6/2007 | Zhang et al. |
| 7,236,291 B2 | 6/2007 | Kaga et al. |
| 7,236,292 B2 | 6/2007 | LeCain et al. |
| 7,242,513 B2 | 7/2007 | Albert et al. |
| 7,247,379 B2 | 7/2007 | Pullen et al. |
| 7,256,766 B2 | 8/2007 | Albert et al. |
| 7,259,744 B2 | 8/2007 | Arango et al. |
| 7,280,094 B2 | 10/2007 | Albert |
| 7,304,634 B2 | 12/2007 | Albert et al. |
| 7,304,787 B2 | 12/2007 | Whitesides et al. |
| 7,312,784 B2 | 12/2007 | Baucom et al. |
| 7,312,794 B2 | 12/2007 | Zehner et al. |
| 7,312,916 B2 | 12/2007 | Pullen et al. |
| 7,321,459 B2 | 1/2008 | Masuda et al. |
| 7,327,511 B2 | 2/2008 | Whitesides et al. |
| 7,339,715 B2 | 3/2008 | Webber et al. |
| 7,352,353 B2 | 4/2008 | Albert et al. |
| 7,365,394 B2 | 4/2008 | Denis et al. |
| 7,365,733 B2 | 4/2008 | Duthaler et al. |
| 7,382,363 B2 | 6/2008 | Albert et al. |
| 7,388,572 B2 | 6/2008 | Duthaler et al. |
| 7,391,555 B2 | 6/2008 | Albert et al. |
| 7,411,719 B2 | 8/2008 | Paolini, Jr. et al. |
| 7,420,549 B2 | 9/2008 | Jacobson et al. |
| 7,442,587 B2 | 10/2008 | Amundson et al. |
| 7,453,445 B2 | 11/2008 | Amundson |
| 2001/0055000 A1 | 12/2001 | Kanae et al. |
| 2002/0060321 A1 | 5/2002 | Kazlas et al. |
| 2002/0090980 A1 | 7/2002 | Wilcox et al. |
| 2002/0106874 A1 | 8/2002 | Iwane et al. |
| 2003/0102858 A1 | 6/2003 | Jacobson et al. |
| 2003/0179436 A1 | 9/2003 | Liang et al. |
| 2004/0105036 A1 | 6/2004 | Danner et al. |
| 2004/0112750 A1 | 6/2004 | Jacobson et al. |
| 2004/0119681 A1 | 6/2004 | Albert et al. |
| 2004/0155857 A1 | 8/2004 | Duthaler et al. |
| 2004/0180476 A1 | 9/2004 | Kazlas et al. |
| 2004/0190114 A1 | 9/2004 | Jacobson et al. |
| 2004/0263947 A1 | 12/2004 | Drzaic et al. |
| 2005/0001810 A1 | 1/2005 | Yakushiji et al. |
| 2005/0007336 A1 | 1/2005 | Albert et al. |
| 2005/0012980 A1 | 1/2005 | Wilcox et al. |
| 2005/0018273 A1 | 1/2005 | Honeyman et al. |
| 2005/0024353 A1 | 2/2005 | Amundson et al. |
| 2005/0062714 A1 | 3/2005 | Zehner et al. |
| 2005/0122284 A1 | 6/2005 | Gates et al. |
| 2005/0122306 A1 | 6/2005 | Wilcox et al. |
| 2005/0122563 A1 | 6/2005 | Honeyman et al. |
| 2005/0152018 A1 | 7/2005 | Abramson et al. |
| 2005/0156340 A1 | 7/2005 | Valianatos et al. |
| 2005/0179642 A1 | 8/2005 | Wilcox et al. |
| 2005/0212747 A1 | 9/2005 | Amundson |
| 2005/0253777 A1 | 11/2005 | Zehner et al. |
| 2005/0259068 A1 | 11/2005 | Nihei et al. |
| 2005/0270261 A1 | 12/2005 | Danner et al. |
| 2005/0280626 A1 | 12/2005 | Amundson et al. |
| 2006/0038772 A1 | 2/2006 | Amundson et al. |
| 2006/0087479 A1 | 4/2006 | Sakurai et al. |
| 2006/0087489 A1 | 4/2006 | Sakurai et al. |
| 2006/0087718 A1 | 4/2006 | Takagi et al. |
| 2006/0139308 A1 | 6/2006 | Jacobson et al. |
| 2006/0139310 A1 | 6/2006 | Zehner et al. |
| 2006/0139311 A1 | 6/2006 | Zehner et al. |
| 2006/0176267 A1 | 8/2006 | Honeyman et al. |
| 2006/0181492 A1 | 8/2006 | Gates et al. |
| 2006/0181504 A1 | 8/2006 | Kawai |
| 2006/0194619 A1 | 8/2006 | Wilcox et al. |
| 2006/0197737 A1 | 9/2006 | Baucom et al. |
| 2006/0197738 A1 | 9/2006 | Kawai |
| 2006/0202949 A1 | 9/2006 | Danner et al. |
| 2006/0209008 A1 | 9/2006 | Nihei et al. |
| 2006/0214906 A1 | 9/2006 | Kobayashi et al. |
| 2006/0231401 A1 | 10/2006 | Sakurai et al. |
| 2006/0232531 A1 | 10/2006 | Amundson et al. |
| 2006/0238488 A1 | 10/2006 | Nihei et al. |
| 2006/0263927 A1 | 11/2006 | Sakurai et al. |
| 2006/0279527 A1 | 12/2006 | Zehner et al. |
| 2006/0291034 A1 | 12/2006 | Patry et al. |
| 2007/0013683 A1 | 1/2007 | Zhou et al. |
| 2007/0035532 A1 | 2/2007 | Amundson et al. |
| 2007/0035808 A1 | 2/2007 | Amundson et al. |
| 2007/0103427 A1 | 5/2007 | Zhou et al. |
| 2008/0074730 A1 | 3/2008 | Cao et al. |

FOREIGN PATENT DOCUMENTS

| | | |
|---|---|---|
| EP | 1 145 072 B1 | 5/2003 |
| JP | 57-7207222 * | 12/1982 |
| JP | 62-269124 A | 11/1987 |
| JP | 64-086116 | 3/1989 |
| JP | 01-267525 A | 10/1989 |
| JP | 02-284125 A | 11/1990 |
| JP | 03-168613 | 7/1991 |
| JP | 08-278491 | 10/1996 |
| JP | 10-149118 A | 6/1998 |

| | | |
|---|---|---|
| JP | 2000-206345 * | 9/2000 |
| JP | 2002-098945 | 4/2002 |
| WO | WO 82/02961 | 9/1982 |
| WO | WO 00/36560 | 6/2000 |
| WO | WO 00/38000 | 6/2000 |
| WO | WO 00/67110 | 11/2000 |
| WO | WO 01/07961 | 2/2001 |
| WO | WO 01/92359 | 12/2001 |
| WO | WO 2004/079442 | 9/2004 |

OTHER PUBLICATIONS

Amundson, K., et al., "Flexible, Active-Matrix Display Constructed Using a Microencapsulated Electrophoretic Material and an Organic-Semiconductor-Based Backplane", SID 01 Digest, 160 (Jun. 2001).

Au, J. et al., "Ultra-Thin 3.1-in. Active-Matrix Electronic Ink Display for Mobile Devices", IDW'02, 223 (2002).

Bach, U., et al., "Nanomaterials-Based Electrochromics for Paper-Quality Displays", Adv. Mater, 14(11), 845 (2002).

Bouchard, A. et al., "High-Resolution Microencapsulated Electrophoretic Display on Silicon", SID 04 Digest, 651 (2004).

Caillot, E. et al. "Active Matrix Electrophoretic Information Display for High Performance Mobile Devices", IDMC Proceedings (2003).

Chen, Y., et al., "A Conformable Electronic Ink Display using a Foil-Based a-Si TFT Array", SID 01 Digest, 157 (Jun. 2001).

Comiskey, B., et al., "An electrophoretic ink for all-printed reflective electronic displays", Nature, 394, 253 (1998).

Comiskey, B., et al., "Electrophoretic Ink: A Printable Display Material", SID 97 Digest (1997), p. 75.

Croucher, M.D., et al., "Electrophoretic Display: Materials as Related to Performance", Photog. Sci. Eng., 25, 80 (1981).

Dalisa, A.L., "Electrophoretic Display Technology", IEEE Trans. Electron Dev., ED-24, 827 (1977).

Danner, G.M. et al., "Reliability Performance for Microencapsulated Electrophoretic Displays with Simulated Active Matrix Drive", SID 03 Digest, 573 (2003).

Drzaic, P., et al., "A Printed and Rollable Bistable Electronic Display", SID 98 Digest (1998), p. 1131.

Duthaler, G., et al., "Active-Matrix Color Displays Using Electrophoretic Ink and Color Filters", SID 02 Digest, 1374 (2002).

Gates, H. et al., "A5 Sized Electronic Paper Display for Document Viewing", SID 05 Digest, (2005).

Gutcho, M.H., Microcapsules and Microencapsulation Techniques, Noyes Data Corp., Park Ridge NJ, (1976).

Hayes, R.A., et al., "Video-Speed Electronic Paper Based on Electrowetting", Nature, vol. 425, Sep. 25, pp. 383-385 (2003).

Henzen, A. et al., "An Electronic Ink Low Latency Drawing Tablet", SID 04 Digest, 1070 (2004).

Henzen, A. et al., "Development of Active Matrix Electronic Ink Displays for Handheld Devices", SID 03 Digest, 176; (2003).

Henzen, A. et al., "Development of Active Matrix Electronic Ink Displays for Smart Handheld Applications", IDW'02, 227 (2002).

Jacobson, J., et al., "The last book", IBM Systems J., 36, 457 (1997).

Jo, G-R, et al., "Toner Display Based on Particle Movements", Chem. Mater, 14, 664 (2002).

Johnson, M. et al., "High Quality Images on Electronic Paper Displays", SID 05 Digest, 1666 (2005).

Kazlas, P. et al., "Card-size Active-matrix Electronic Ink Display", Eurodisplay 2002, 259 (2002).

Kazlas, P., et al., "12.1" SVGA Microencapsulated Electrophoretic Active Matrix Display for Information Applicances, SID 01 Digest, 152 (Jun. 2001).

Kitamura, T., et al., "Electrical toner movement for electronic paper-like display", Asia Display/IDW '01, p. 1517, Paper HCS1-1 (2001).

O'Regan, B. et al., "A Low Cost, High-efficiency Solar Cell Based on Dye-sensitized colloidal $TiO_2$ Films", Nature, vol. 353, Oct. 24, 1991, 773-740.

Ota, I., et al., "Developments in Electrophoretic Displays", Proceedings of the SID, 18, 243 (1977).

Pitt, M.G., et al., "Power Consumption of Microencapsulated Electrophoretic Displays for Smart Handheld Applications", SID 02 Digest, 1378 (2002).

Shiwa, S., et al., "Electrophoretic Display Method Using Ionographic Technology," SID 88 Digest (1988), p. 61.

Webber, R., "Image Stability in Active-Matrix Microencapsulated Electrophoretic Displays", SID 02 Digest, 126 (2002).

Whitesides, T. et al., "Towards Video-rate Microencapsulated Dual-Particle Electrophoretic Displays", SID 04 Digest, 133 (2004).

Wood, D., "An Electrochromic Renaissance?" Information Display, 18(3), 24 (Mar. 2002).

Yamaguchi, Y., et al., "Toner display using insulative particles charged triboelectrically", Asia Display/IDW '01, p. 1729, Paper AMD4-4 (2001).

Zehner, R. et al., "Drive Waveforms for Active Matrix Electrophoretic Displays", SID 03 Digest, 842 (2003).

* cited by examiner

COMPONENTS AND METHODS FOR USE IN ELECTRO-OPTIC DISPLAYS

REFERENCE TO RELATED APPLICATIONS

This application is a continuation-in-part of application Ser. No. 10/605,024, filed Sep. 2, 2003 (Publication No. 2004/0155857), which claims benefit of application Ser. No. 60/319,516, filed Sep. 3, 2002.

This application claims benefit of application Ser. No. 60/596,743, filed Oct. 18, 2005, and of application Ser. No. 60/596,799, filed Oct. 21, 2005.

This application is related to:

(a) U.S. Pat. No. 6,982,178, issued Jan. 3, 2006 on application Ser. No. 10/249,957, filed May 22, 2003, which claims benefit of Application Ser. No. 60/319,300, filed Jun. 10, 2002, and Application Ser. No. 60/320,186, filed May 12, 2003;

(b) Application Ser. No. 10/907,065, filed Mar. 18, 2005 (Publication No. 2005/0146774, now U.S. Pat. No. 7,236,292), which is a divisional of the aforementioned application Ser. No. 10/249,957;

(c) U.S. Pat. No. 7,110,164, issued Sep. 19, 2006 on application Ser. No. 10/904,063, filed Oct. 21, 2004, which is a continuation-in-part of the aforementioned application Ser. No. 10/249,957 and of the aforementioned application Ser. No. 10/605,024; and (d) U.S. Pat. No. 6,864,875, issued Mar. 8, 2005 on application Ser. No. 10/145,861, filed May 13, 2002, which is a continuation of application Ser. No. 09/436,303, filed Nov. 8, 1999 (now abandoned), which is itself a divisional of application Ser. No. 09/289,507, filed Apr. 9, 1999 (now U.S. Pat. No. 7,075,502, issued Jul. 11, 2006).

The entire contents of these patents and applications, and of all other U.S. patents and published and copending applications mentioned below, are herein incorporated by reference.

BACKGROUND OF INVENTION

The present invention relates to components and methods for use in electro-optic displays. Some of the displays produced in accordance with this invention are color displays. This invention relates primarily to such components and methods for forming electro-optic displays containing an electro-optic medium which is a solid (such displays may hereinafter for convenience be referred to as "solid electro-optic displays"), in the sense that the electro-optic medium has solid external surfaces, although the medium may, and often does, have internal liquid- or gas-filled spaces, and to methods for assembling displays using such an electro-optic medium. Thus, the term "solid electro-optic displays" includes encapsulated electrophoretic displays, encapsulated liquid crystal displays, and other types of displays discussed below.

The term "electro-optic", as applied to a material or a display, is used herein in its conventional meaning in the imaging art to refer to a material having first and second display states differing in at least one optical property, the material being changed from its first to its second display state by application of an electric field to the material. Although the optical property is typically color perceptible to the human eye, it may be another optical property, such as optical transmission, reflectance, luminescence or, in the case of displays intended for machine reading, pseudo-color in the sense of a change in reflectance of electromagnetic wavelengths outside the visible range.

The terms "bistable" and "bistability" are used herein in their conventional meaning in the art to refer to displays comprising display elements having first and second display states differing in at least one optical property, and such that after any given element has been driven, by means of an addressing pulse of finite duration, to assume either its first or second display state, after the addressing pulse has terminated, that state will persist for at least several times, for example at least four times, the minimum duration of the addressing pulse required to change the state of the display element. It is shown in published U.S. Patent Application No. 2002/0180687 that some particle-based electrophoretic displays capable of gray scale are stable not only in their extreme black and white states but also in their intermediate gray states, and the same is true of some other types of electro-optic displays. This type of display is properly called "multi-stable" rather than bistable, although for convenience the term "bistable" may be used herein to cover both bistable and multi-stable displays.

Several types of electro-optic displays are known. One type of electro-optic display is a rotating bichromal member type as described, for example, in U.S. Pat. Nos. 5,808,783; 5,777,782; 5,760,761; 6,054,071 6,055,091; 6,097,531; 6,128,124; 6,137,467; and 6,147,791 (although this type of display is often referred to as a "rotating bichromal ball" display, the term "rotating bichromal member" is preferred as more accurate since in some of the patents mentioned above the rotating members are not spherical). Such a display uses a large number of small bodies (typically spherical or cylindrical) which have two or more sections with differing optical characteristics, and an internal dipole. These bodies are suspended within liquid-filled vacuoles within a matrix, the vacuoles being filled with liquid so that the bodies are free to rotate. The appearance of the display is changed to applying an electric field thereto, thus rotating the bodies to various positions and varying which of the sections of the bodies is seen through a viewing surface. This type of electro-optic medium is typically bistable.

Another type of electro-optic display uses an electrochromic medium, for example an electrochromic medium in the form of a nanochromic film comprising an electrode formed at least in part from a semi-conducting metal oxide and a plurality of dye molecules capable of reversible color change attached to the electrode; see, for example O'Regan, B., et al., Nature 1991, 353, 737; and Wood, D., Information Display, 18(3), 24 (March 2002). See also Bach, U., et al., Adv. Mater., 2002, 14(11), 845. Nanochromic films of this type are also described, for example, in U.S. Pat. Nos. 6,301,038; 6,870,657; and 6,950,220. This type of medium is also typically bistable.

Another type of electro-optic display, which has been the subject of intense research and development for a number of years, is the particle-based electrophoretic display, in which a plurality of charged particles move through a suspending fluid under the influence of an electric field. Electrophoretic displays can have attributes of good brightness and contrast, wide viewing angles, state bistability, and low power consumption when compared with liquid crystal displays. Nevertheless, problems with the long-term image quality of these displays have prevented their widespread usage. For example, particles that make up electrophoretic displays tend to settle, resulting in inadequate service-life for these displays.

As noted above, electrophoretic media require the presence of a fluid. In most prior art electrophoretic media, this fluid is a liquid, but electrophoretic media can be produced using gaseous fluids; see, for example, Kitamura, T., et al., "Electrical toner movement for electronic paper-like display", IDW Japan, 2001, Paper HCS1-1, and Yamaguchi, Y., et al., "Toner display using insulative particles charged triboelectrically", IDW Japan, 2001, Paper AMD4-4). See also U.S. Patent Publication No. 2005/0001810; European Patent Applications 1,462,847; 1,482,354; 1,484,635; 1,500,971; 1,501,194; 1,536,271; 1,542,067; 1,577,702; 1,577,703; and 1,598,694; and International Applications WO 2004/090626; WO 2004/079442; and WO 2004/001498. Such gas-based electrophoretic media appear to be susceptible to the same types of problems due to particle settling as liquid-based electrophoretic media, when the media are used in an orientation which permits such settling, for example in a sign where the medium is disposed in a vertical plane. Indeed, particle settling appears to be a more serious problem in gas-based electrophoretic media than in liquid-based ones, since the lower viscosity of gaseous suspending fluids as compared with liquid ones allows more rapid settling of the electrophoretic particles.

Numerous patents and applications assigned to or in the names of the Massachusetts Institute of Technology (MIT) and E Ink Corporation have recently been published describing encapsulated electrophoretic media. Such encapsulated media comprise numerous small capsules, each of which itself comprises an internal phase containing electrophoretically-mobile particles suspended in a liquid suspending medium, and a capsule wall surrounding the internal phase. Typically, the capsules are themselves held within a polymeric binder to form a coherent layer positioned between two electrodes. Encapsulated media of this type are described, for example, in U.S. Pat. Nos. 5,930,026; 5,961,804; 6,017,584; 6,067,185; 6,118,426; 6,120,588; 6,120,839; 6,124,851; 6,130,773; 6,130,774; 6,172,798; 6,177,921; 6,232,950; 6,249,271; 6,252,564; 6,262,706; 6,262,833; 6,300,932; 6,312,304; 6,312,971; 6,323,989; 6,327,072; 6,376,828; 6,377,387; 6,392,785; 6,392,786; 6,413,790; 6,422,687; 6,445,374; 6,445,489; 6,459,418; 6,473,072; 6,480,182; 6,498,114; 6,504,524; 6,506,438; 6,512,354; 6,515,649; 6,518,949; 6,521,489; 6,531,997; 6,535,197; 6,538,801; 6,545,291; 6,580,545; 6,639,578; 6,652,075; 6,657,772; 6,664,944; 6,680,725; 6,683,333; 6,704,133; 6,710,540; 6,721,083; 6,724,519; 6,727,881; 6,738,050; 6,750,473; 6,753,999; 6,816,147; 6,819,471; 6,822,782; 6,825,068; 6,825,829; 6,825,970; 6,831,769; 6,839,158; 6,842,167; 6,842,279; 6,842,657; 6,864,875; 6,865,010; 6,866,760; 6,870,661; 6,900,851; 6,922,276; 6,950,200; 6,958,848; 6,967,640; 6,982,178; 6,987,603; 6,995,550; 7,002,728; 7,012,600; 7,012,735; 7,023,430; 7,030,412; 7,030,854; 7,034,783; 7,038,655; 7,061,663; 7,071,913; 7,075,502; 7,075,703; 7,079,305; 7,106,296; 7,109,968; 7,110,163; 7,110,164; 7,116,318; 7,116,466; 7,119,759; and 7,119,772; and U.S. Patent Applications Publication Nos. 2002/0060321; 2002/0090980; 2002/0180687; 2003/0011560; 2003/0102858; 2003/0151702; 2003/0222315; 2004/0014265; 2004/0075634; 2004/0094422; 2004/0105036; 2004/0112750; 2004/0119681; 2004/0136048; 2004/0155857; 2004/0180476; 2004/0190114; 2004/0196215; 2004/0226820; 2004/0239614; 2004/0257635; 2004/0263947; 2005/0000813; 2005/0007336; 2005/0012980; 2005/0017944; 2005/0018273; 2005/0024353; 2005/0062714; 2005/0067656; 2005/0078099; 2005/0099672; 2005/0122284; 2005/0122306; 2005/0122563; 2005/0122565; 2005/0134554; 2005/0146774; 2005/0151709; 2005/0152018; 2005/0152022; 2005/0156340; 2005/0168799; 2005/0179642; 2005/0190137; 2005/0212747; 2005/0213191; 2005/0219184; 2005/0253777; 2005/0270261; 2005/0280626; 2006/0007527; 2006/0024437; 2006/0038772; 2006/0139308; 2006/0139310; 2006/0139311; 2006/0176267; 2006/0181492; 2006/0181504; 2006/0194619; 2006/0197736; 2006/0197737; 2006/0197738; 2006/0198014; 2006/0202949; and 2006/0209388; and International Applications Publication Nos. WO 00/38000; WO 00/36560; WO 00/67110; and WO 01/07961; and European Patents Nos. 1,099,207 B1; and 1,145,072 B1.

Many of the aforementioned patents and applications recognize that the walls surrounding the discrete microcapsules in an encapsulated electrophoretic medium could be replaced by a continuous phase, thus producing a so-called polymer-dispersed electrophoretic display, in which the electrophoretic medium comprises a plurality of discrete droplets of an electrophoretic fluid and a continuous phase of a polymeric material, and that the discrete droplets of electrophoretic fluid within such a polymer-dispersed electrophoretic display may be regarded as capsules or microcapsules even though no discrete capsule membrane is associated with each individual droplet; see for example, the aforementioned U.S. Pat. No. 6,866,760. Accordingly, for purposes of the present application, such polymer-dispersed electrophoretic media are regarded as sub-species of encapsulated electrophoretic media.

Although electrophoretic media are often opaque (since, for example, in many electrophoretic media, the particles substantially block transmission of visible light through the display) and operate in a reflective mode, many electrophoretic displays can be made to operate in a so-called "shutter mode" in which one display state is substantially opaque and one is light-transmissive. See, for example, the aforementioned U.S. Pat. Nos. 6,130,774 and 6,172,798, and U.S. Pat. Nos. 5,872,552; 6,144,361; 6,271,823; 6,225,971; and 6,184,856. Dielectrophoretic displays, which are similar to electrophoretic displays but rely upon variations in electric field strength, can operate in a similar mode; see U.S. Pat. No. 4,418,346.

An encapsulated electrophoretic display typically does not suffer from the clustering and settling failure mode of traditional electrophoretic devices and provides further advantages, such as the ability to print or coat the display on a wide variety of flexible and rigid substrates. (Use of the word "printing" is intended to include all forms of printing and coating, including, but without limitation: pre-metered coatings such as patch die coating, slot or extrusion coating, slide or cascade coating, curtain coating; roll coating such as knife over roll coating, forward and reverse roll coating; gravure coating; dip coating; spray coating; meniscus coating; spin coating; brush coating; air knife coating; silk screen printing processes; electrostatic printing processes; thermal printing processes; ink jet printing processes; and other similar techniques.) Thus, the resulting display can be flexible. Further, because the display medium can be printed (using a variety of methods), the display itself can be made inexpensively.

A related type of electrophoretic display is a so-called "microcell electrophoretic display". In a microcell electrophoretic display, the charged particles and the suspending fluid are not encapsulated within microcapsules but instead are retained within a plurality of cavities formed within a carrier medium, typically a polymeric film. See, for example, International Application Publication No. WO 02/01281, and published US Application No. 2002/0075556, both assigned to Sipix Imaging, Inc.

Other types of electro-optic media may also be used in the displays of the present invention.

An electro-optic display normally comprises a layer of electro-optic material and at least two other layers disposed on opposed sides of the electro-optic material, one of these two layers being an electrode layer. In most such displays both the layers are electrode layers, and one or both of the electrode layers are patterned to define the pixels of the display. For example, one electrode layer may be patterned into elongate row electrodes and the other into elongate column electrodes running at right angles to the row electrodes, the pixels being defined by the intersections of the row and column electrodes. Alternatively, and more commonly, one electrode layer has the form of a single continuous electrode and the other electrode layer is patterned into a matrix of pixel electrodes, each of which defines one pixel of the display. In another type of electro-optic display, which is intended for use with a stylus, print head or similar movable electrode separate from the display, only one of the layers adjacent the electro-optic layer comprises an electrode, the layer on the opposed side of the electro-optic layer typically being a protective layer intended to prevent the movable electrode damaging the electro-optic layer.

The manufacture of a three-layer electro-optic display normally involves at least one lamination operation. For example, in several of the aforementioned MIT and E Ink patents and applications, there is described a process for manufacturing an encapsulated electrophoretic display in which an encapsulated electrophoretic medium comprising capsules in a binder is coated on to a flexible substrate comprising indium-tin-oxide (ITO) or a similar conductive coating (which acts as an one electrode of the final display) on a plastic film, the capsules/binder coating being dried to form a coherent layer of the electrophoretic medium firmly adhered to the substrate. Separately, a backplane, containing an array of pixel electrodes and an appropriate arrangement of conductors to connect the pixel electrodes to drive circuitry, is prepared. To form the final display, the substrate having the capsule/binder layer thereon is laminated to the backplane using a lamination adhesive. (A very similar process can be used to prepare an electrophoretic display usable with a stylus or similar movable electrode by replacing the backplane with a simple protective layer, such as a plastic film, over which the stylus or other movable electrode can slide.) In one preferred form of such a process, the backplane is itself flexible and is prepared by printing the pixel electrodes and conductors on a plastic film or other flexible substrate. The obvious lamination technique for mass production of displays by this process is roll lamination using a lamination adhesive. Similar manufacturing techniques can be used with other types of electro-optic displays. For example, a microcell electrophoretic medium or a rotating bichromal member medium may be laminated to a backplane in substantially the same manner as an encapsulated electrophoretic medium.

As discussed in the aforementioned U.S. Pat. No. 6,982, 178, many of the components used in solid electro-optic displays, and the methods used to manufacture such displays, are derived from technology used in liquid crystal displays (LCD's), which are of course also electro-optic displays, though using a liquid rather than a solid medium. For example, solid electro-optic displays may make use of an active matrix backplane comprising an array of transistors or diodes and a corresponding array of pixel electrodes, and a "continuous" front electrode (in the sense of an electrode which extends over multiple pixels and typically the whole display) on a transparent substrate, these components being essentially the same as in LCD's. However, the methods used for assembling LCD's cannot be used with solid electro-optic displays. LCD's are normally assembled by forming the backplane and front electrode on separate glass substrates, then adhesively securing these components together leaving a small aperture between them, placing the resultant assembly under vacuum, and immersing the assembly in a bath of the liquid crystal, so that the liquid crystal flows through the aperture between the backplane and the front electrode. Finally, with the liquid crystal in place, the aperture is sealed to provide the final display.

This LCD assembly process cannot readily be transferred to solid electro-optic displays. Because the electro-optic material is solid, it must be present between the backplane and the front electrode before these two integers are secured to each other. Furthermore, in contrast to a liquid crystal material, which is simply placed between the front electrode and the backplane without being attached to either, a solid electro-optic medium normally needs to be secured to both; in most cases the solid electro-optic medium is formed on the front electrode, since this is generally easier than forming the medium on the circuitry-containing backplane, and the front electrode/electro-optic medium combination is then laminated to the backplane, typically by covering the entire surface of the electro-optic medium with an adhesive and laminating under heat, pressure and possibly vacuum.

As discussed in the aforementioned U.S. Pat. No. 6,312, 304, the manufacture of solid electro-optic displays also presents problems in that the optical components (the electro-optic medium) and the electronic components (in the backplane) have differing performance criteria. For example, it is desirable for the optical components to optimize reflectivity, contrast ratio and response time, while it is desirable for the electronic components to optimize conductivity, voltage-current relationship, and capacitance, or to possess memory, logic, or other higher-order electronic device capabilities. Therefore, a process for manufacturing an optical component may not be ideal for manufacturing an electronic component, and vice versa. For example, a process for manufacturing an electronic component can involve processing under high temperatures. The processing temperature can be in the range from about 300° C. to about 600° C. Subjecting many optical components to such high temperatures, however, can be harmful to the optical components by degrading the electro-optic medium chemically or by causing mechanical damage.

This patent describes a method of manufacturing an electro-optic display comprising providing a modulating layer including a first substrate and an electro-optic material provided adjacent the first substrate, the modulating layer being capable of changing a visual state upon application of an electric field; providing a pixel layer comprising a second substrate, a plurality of pixel electrodes provided on a front surface of the second substrate and a plurality of contact pads provided on a rear surface of the second substrate, each pixel electrode being connected to a contact pad through a via extending through the second substrate; providing a circuit layer including a third substrate and at least one circuit element; and laminating the modulating layer, the pixel layer, and the circuit layer to form the electro-optic display.

Electro-optic displays are often costly; for example, the cost of the color LCD found in a portable computer is typically a substantial fraction of the entire cost of the computer. As the use of electro-optic displays spreads to devices, such as cellular telephones and personal digital assistants (PDA's), much less costly than portable computers, there is great pressure to reduce the costs of such displays. The ability to form layers of some solid electro-optic media by printing techniques on flexible substrates, as discussed above, opens up the possibility of reducing the cost of electro-optic components of displays by using mass production techniques such as roll-to-roll coating using commercial equipment used for the production of coated papers, polymeric films and similar media. However, such equipment is costly and the areas of electro-optic media presently sold may be insufficient to justify dedicated equipment, so that it may typically be necessary to transport the coated medium from a commercial coating plant to the plant used for final assembly of electro-optic displays without damage to the relatively fragile layer of electro-optic medium.

Also, most prior art methods for final lamination of electro-optic displays are essentially batch methods in which the electro-optic medium, the lamination adhesive and the backplane are only brought together immediately prior to final assembly, and it is desirable to provide methods better adapted for mass production.

The aforementioned U.S. Pat. No. 6,982,178 describes a method of assembling a solid electro-optic display (including a particle-based electrophoretic display) which is well adapted for mass production. Essentially, this patent describes a so-called "front plane laminate" ("FPL") which comprises, in order, a light-transmissive electrically-conductive layer; a layer of a solid electro-optic medium in electrical contact with the electrically-conductive layer; an adhesive layer; and a release sheet. Typically, the light-transmissive electrically-conductive layer will be carried on a light-transmissive substrate, which is preferably flexible, in the sense that the substrate can be manually wrapped around a drum (say) 10 inches (254 mm) in diameter without permanent deformation. The term "light-transmissive" is used in this patent and herein to mean that the layer thus designated transmits sufficient light to enable an observer, looking through that layer, to observe the change in display states of the electro-optic medium, which will be normally be viewed through the electrically-conductive layer and adjacent substrate (if present). The substrate will be typically be a polymeric film, and will normally have a thickness in the range of about 1 to about 25 mil (25 to 634 µm), preferably about 2 to about 10 mil (51 to 254 µm). The electrically-conductive layer is conveniently a thin metal or metal oxide layer of, for example, aluminum or ITO, or may be a conductive polymer. Poly(ethylene terephthalate) (PET) films coated with aluminum or ITO are available commercially, for example as "aluminized Mylar" ("Mylar" is a Registered Trade Mark) from E.I. du Pont de Nemours & Company, Wilmington Del., and such commercial materials may be used with good results in the front plane laminate.

Assembly of an electro-optic display using such a front plane laminate may be effected by removing the release sheet from the front plane laminate and contacting the adhesive layer with the backplane under conditions effective to cause the adhesive layer to adhere to the backplane, thereby securing the adhesive layer, layer of electro-optic medium and electrically-conductive layer to the backplane. This process is well-adapted to mass production since the front plane laminate may be mass produced, typically using roll-to-roll coating techniques, and then cut into pieces of any size needed for use with specific backplanes.

The aforementioned U.S. Pat. No. 6,982,178 also describes a method for testing the electro-optic medium in a front plane laminate prior to incorporation of the front plane laminate into a display. In this testing method, the release sheet is provided with an electrically conductive layer, and a voltage sufficient to change the optical state of the electro-optic medium is applied between this electrically conductive layer and the electrically conductive layer on the opposed side of the electro-optic medium. Observation of the electro-optic medium will then reveal any faults in the medium, thus avoiding laminating faulty electro-optic medium into a display, with the resultant cost of scrapping the entire display, not merely the faulty front plane laminate.

The aforementioned U.S. Pat. No. 6,982,178 also describes a second method for testing the electro-optic medium in a front plane laminate by placing an electrostatic charge on the release sheet, thus forming an image on the electro-optic medium. This image is then observed in the same way as before to detect any faults in the electro-optic medium.

The aforementioned 2004/0155857 describes a so-called "double release film" which is essentially a simplified version of the front plane laminate of the aforementioned U.S. Pat. No. 6,982,178. One form of the double release sheet comprises a layer of a solid electro-optic medium sandwiched between two adhesive layers, one or both of the adhesive layers being covered by a release sheet. Another form of the double release sheet comprises a layer of a solid electro-optic medium sandwiched between two release sheets. Both forms of the double release film are intended for use in a process generally similar to the process for assembling an electro-optic display from a front plane laminate already described, but involving two separate laminations; typically, in a first lamination the double release sheet is laminated to a front electrode to form a front sub-assembly, and then in a second lamination the front sub-assembly is laminated to a backplane to form the final display.

Electro-optic displays manufactured using the aforementioned front plane laminates or double release films have a layer of lamination adhesive between the electro-optic layer itself and the backplane, and the presence of this lamination adhesive layer affects the electro-optic characteristics of the displays. In particular, the electrical conductivity of the lamination adhesive layer affects both the low temperature performance and the resolution of the display. The low temperature performance of the display can (it has been found empirically) be improved by increasing the conductivity of the lamination adhesive layer, for example by doping the layer with tetrabutylammonium hexafluorophosphate or other materials as described in the aforementioned U.S. Pat. No. 7,012,735 and Publication No. 2005/0122565. However, increasing the conductivity of the lamination adhesive layer in this manner tends to increase pixel blooming (a phenomenon whereby the area of the electro-optic layer which changes optical state in response to change of voltage at a pixel electrode is larger than the pixel electrode itself), and this blooming tends to reduce the resolution of the display. Hence, this type of display apparently intrinsically requires a compromise between low temperature performance and display resolution, and in practice it is usually the low temperature performance which is sacrificed.

This variation of low temperature performance and display resolution with lamination adhesive conductivity may be understood in terms of a stacked resistor model, whereby the electro-optic layer and the lamination adhesive layer are modeled as two resistors connected in series between the display electrodes. As the conductivity of the lamination adhesive is increased, more of the voltage applied between the electrodes is dropped across the electro-optic layer. When the conductivity of the lamination adhesive layer is more than about 10 times that of the electro-optic layer, essentially the full value of the applied voltage is used to switch the electro-optic layer, so further increases in lamination adhesive conductivity do not improve electro-optic performance. However, the lamination adhesive conductivity cannot be made too high, since then the lamination adhesive cannot maintain lateral differences in potential, with the result that resolution is lost, with at least part of the spatial information in the backplane destroyed by the lamination adhesive shorting between adjacent electrodes.

At least when the electro-optic medium is an encapsulated electrophoretic medium, for all known useful lamination adhesives, the temperature dependence of the conductivity of the lamination adhesive is greater than that of the electro-optic layer. The conductivity of both layers decreases with temperature, but that of the lamination adhesive decreases more rapidly. If the lamination adhesive were formulated so that it was only just capable of providing good electro-optic performance at room temperature, as the temperature was reduced the lamination adhesive would rapidly become less conductive than the electro-optic layer. Under these conditions, the applied voltage is divided such that very little potential drop occurs across the electro-optic layer; instead, most of the potential drop occurs across the lamination adhesive layer, and hence does not contribute to switching of the electro-optic layer.

Hence, there is a need for an electro-optic display with improved low temperature performance without compromising the resolution of the display, and the present invention seeks to provide such an electro-optic display and components and methods for use in the manufacture thereof.

Preferred forms of the present invention can also assist in the production of color electro-optic displays. Most types of electro-optic media have only a limited number of optical states, for example a dark (black) state, a light (white) state and, in some cases, one or more intermediate gray states. Accordingly, to construct a full color display using such media, it is common practice to place an electro-optic medium adjacent a color filter array having, for example, multiple red, green and blue areas, and to provide a driving arrangement for the electro-optic medium which permits independent control of the medium adjacent each red, green or blue area. Certain applications of color filter arrays with electrophoretic displays are described in the aforementioned U.S. Pat. No. 6,864,875. The aforementioned 2003/0011560 describes ways for modifying the optical properties of electrophoretic displays by incorporating an optical biasing element in any one of several components of the display.

The present invention seeks to provide improvements in color electro-optic displays and in processes for the production of such displays.

SUMMARY OF THE INVENTION

Accordingly, in one aspect this invention provides an electro-optic display comprising, in order:
a backplane comprising a plurality of pixel electrodes;
a layer of a solid electro-optic medium;
an adhesive layer; and
at least one of a light-transmissive protective layer and a light-transmissive electrically-conductive layer.

In one form of this electro-optic display of the present invention, the electro-optic layer is in direct contact with the backplane. In another form of this electro-optic display, an auxiliary adhesive layer is interposed between the backplane and the electro-optic layer. For reasons explained below, this auxiliary adhesive layer typically has a thickness not greater than about 10 µm and/or not greater than about one half of the thickness of the (main) adhesive layer on the opposed side of the electro-optic layer.

The adhesive layer in the electro-optic display of the present invention can be used to provide a convenient and flexible color filter array. For this purpose, the adhesive layer may comprise at least two sections having differing colors; to provide a full color display, the adhesive should have sections having at least three different colors, for example yellow, cyan and magenta, or red, green and blue, or red, green, blue and clear sections. As discussed in more detail below, the adhesive layer is desirably colored using at least one pigment; this pigment may have an average particle size in the range of about 5 to about 50 nm. The adhesive layer may comprise other additives, such as an ultra-violet absorber and/or a light-scattering or light-diffusing material.

The electro-optic display of the present invention may comprise both a light-transmissive protective layer and a light-transmissive electrically-conductive layer, the electrically-conductive layer being disposed between the protective layer and the adhesive layer. The electro-optic display may use of any of the types of solid electro-optic media described above. Thus, the present display may comprise an electrochromic or rotating bichromal member medium, or an electrophoretic medium having a plurality of electrically charged particles disposed in a fluid and capable of moving through the fluid on application of an electric field to the electro-optic medium. If an electrophoretic medium is used, the electrically charged particles and the fluid may be encapsulated within a plurality of capsules or cells, or may be present as a plurality of discrete droplets held within a polymeric continuous phase. The fluid may be liquid or gaseous.

In another aspect, this invention provides an article of manufacture comprising, in order:
a release sheet;
a layer of a solid electro-optic medium;
an adhesive layer; and
at least one of a light-transmissive protective layer and a light-transmissive electrically-conductive layer.

For reasons discussed below, this article of manufacture may hereinafter be called an "inverted front plane laminate" or "inverted FPL" of the present invention.

This inverted front plane laminate of the present invention may include any of the optional features of the electro-optic display of the present invention, as described above.

DETAILED DESCRIPTION

As already indicated, the present invention can alleviate, or even eliminate, the compromise between resolution and low temperature performance hitherto experienced in electro-optic displays by inverting the order of the electro-optic layer and the lamination adhesive layer in the stack forming the final display, so that the high resolution part of the display (for example the backplane, especially a thin film transistor (TFT) backplane) is in direct contact with the electro-optic layer, or is separated therefrom only by an auxiliary adhesive layer having only a small thickness. With a display of this structure, the display resolution is independent of the lamination adhesive conductivity, so that a lamination adhesive sufficiently conductive to have good low temperature performance can be used without compromising display resolution.

The adhesive layer which is present between the electro-optic layer and the front electrode or front protective layer in the display of the present invention can provide a convenient color filter array.

Figure 1:
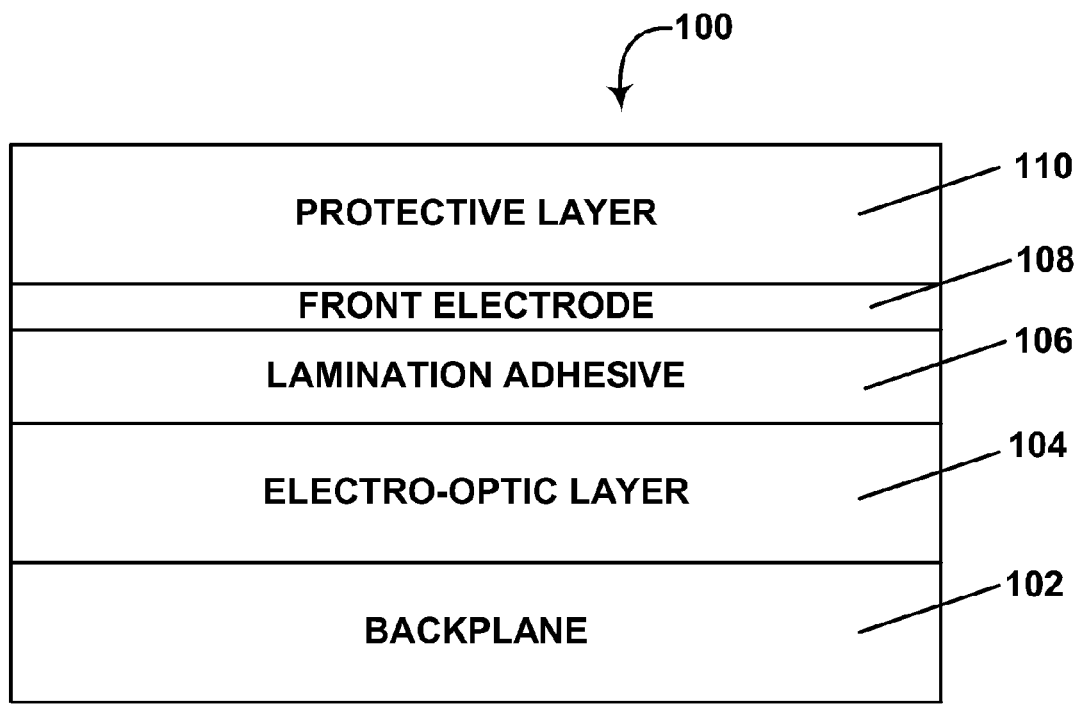
FIG. 1 is a schematic section through a first electro-optic display of the present invention.

FIG. 1 of the accompanying drawings is a highly schematic cross-section through a first display of the present invention. This display (generally designated 100) comprises a backplane 102 which comprises a plurality of pixel electrodes and may be of any conventional type, for example a TFT active matrix backplane, or a direct drive backplane in which each pixel electrode is provided with a separate voltage supply line so that a controller (not shown) can control the voltage of each pixel electrode independently. An electro-optic layer 104, which may be of any of the types discussed above, is in direct contact with the backplane 102; alternatively a thin (typically less than 10 µm, or less than half the thickness of the main layer of lamination adhesive described below) auxiliary layer of lamination adhesive (not shown) may be provided between the backplane 102 and the electro-optic layer 104. On the opposed side of the electro-optic layer 104 from the backplane 102 is disposed a main lamination adhesive layer 106, which can be chosen to give good low temperature performance, and may, for example, be a highly doped polyurethane adhesive. The last two layers of the display 100 are a front light-transmissive electrically-conductive electrode layer 108 and a light-transmissive protective layer 110; as discussed In the aforementioned U.S. Pat. Nos. 6,982,178 and 7,110,164, and Publication No. 2004/0155857, the layers 108 and 110 are conveniently supplied using commercially available polymer films coated with very thin conductive layers, for example poly(ethylene terephthalate) (PET) films coated with indium tin oxide (ITO) or aluminum.

As indicated above, only one of the layers 108 and 110 need be present in the display or inverted front plane laminate of the present invention. At least in theory, if the electrode layer 108 is sufficiently mechanically robust to survive normal handling, the protective layer 110 can be omitted; in practice, however, light-transmissive electrodes are normally so thin that some form of protective layer is required. To provide the maximum voltage drop across the electro-optic layer 104 and hence the fastest switching speed, the protective layer should of course be disposed on the opposed side of the electrode layer from the electro-optic layer. In certain types of displays, for example those intended for use with a stylus or an external print head, the electrode layer 108 may be omitted.

Figure 2:
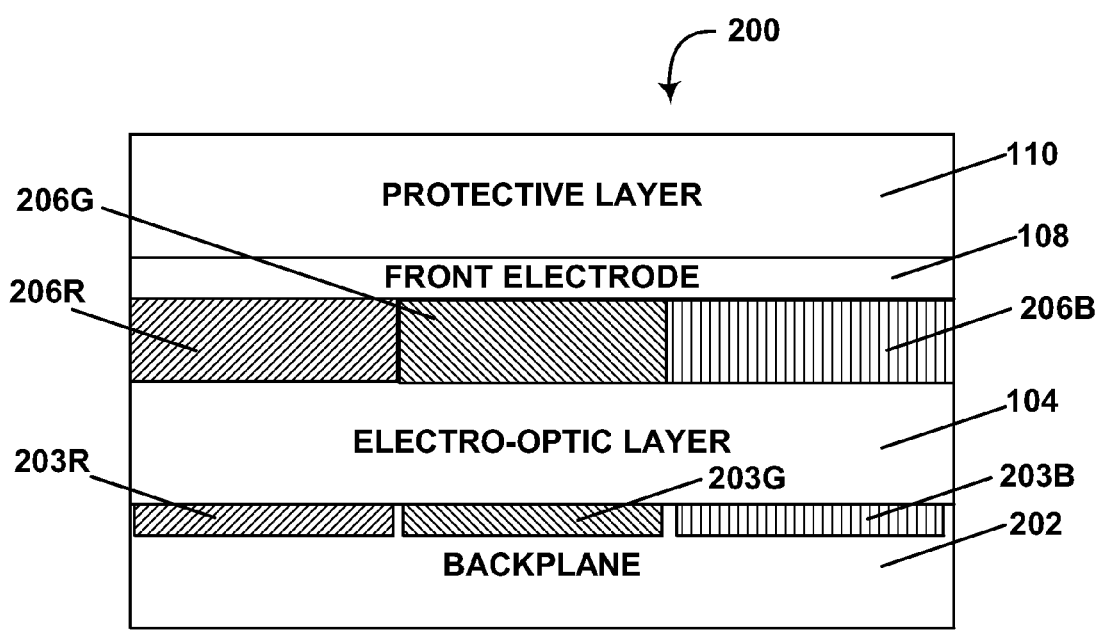
FIG. 2 is a schematic section through a second electro-optic display of the present invention in which the adhesive layer is modified to provide a color filter array.

FIG. 2 of the accompanying drawings illustrates a second display (generally designated 200) of the present invention, this display being generally similar to that of FIG. 1 but being intended to display full color images. The display 200 comprises a backplane 202, which again can be of any conventional type. The backplane 202 is illustrated as comprising three pixel electrodes 203R, 203G and 203B. An electro-optic layer 104 identical to that shown in FIG. 1, is in direct contact with the backplane 202. On the opposed side of the electro-optic layer 104 from the backplane 202 is disposed a main lamination adhesive layer, which is colored to form red, green and blue strips 206R, 206G and 206B respectively, these strips being aligned with the corresponding pixel electrodes 203R, 203G and 203B respectively; as is well known to those skilled in display technology, such alignment of the various colored strips with the pixel electrodes is necessary to ensure that colors can be written on the displays independently of one another, as required for accurate color reproduction. Thus the lamination adhesive layer also serves as a color filter array. The last two layers of the display are a front light-transmissive electrically-conductive electrode layer 108 and a light-transmissive protective layer 110, identical to those shown in FIG. 1.

Figure 3:
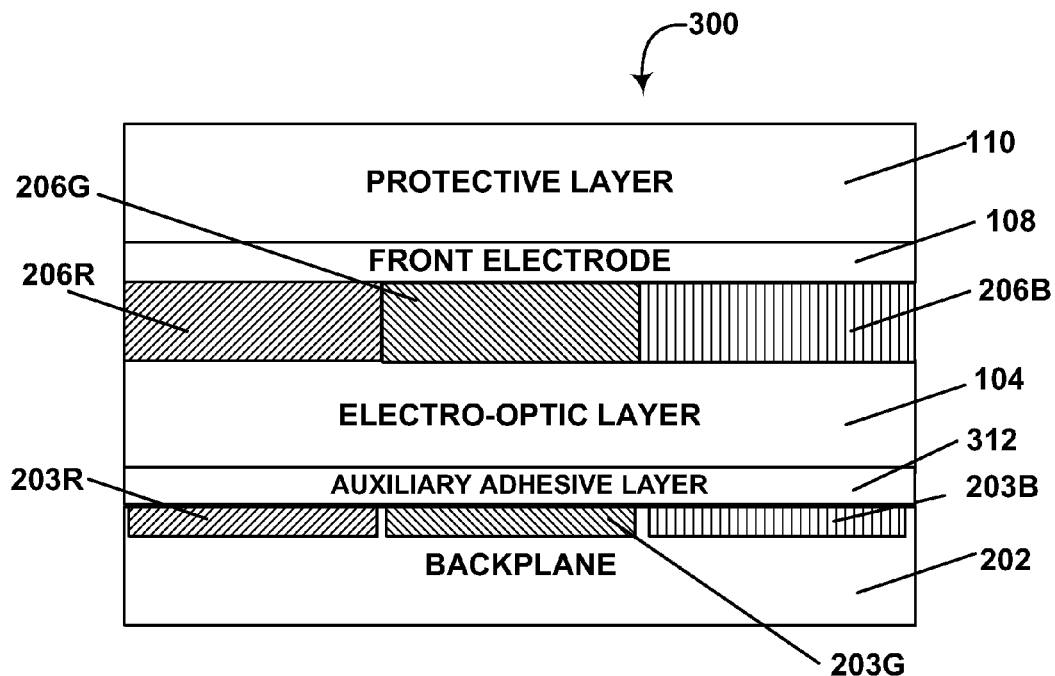
FIG. 3 is a schematic section through third electro-optic display of the present invention which is similar to the second display shown in FIG. 2 but has an auxiliary adhesive layer between the electro-optic layer and the backplane.

FIG. 3 of the accompanying drawings shows a schematic section through a third display (generally designated 300) of the present invention which is generally similar to the display 200 shown in FIG. 2 but in which a thin auxiliary adhesive layer 312 is disposed between the backplane 202 and the electro-optic layer 104. This auxiliary adhesive layer 312 is not colored; since most electro-optic media are opaque, the auxiliary adhesive layer 312 is not visible to an observer viewing the display 300 through the protective layer 110 and hence the auxiliary adhesive layer 312 normally cannot function as a color filter array. However, if for example the electro-optic layer 104 were intended to operate in shutter mode and the backplane 202 made light-transmissive so that the display 300 could be viewed in transmission, the auxiliary adhesive layer could be used as a color filter array.

Displays having the structures shown in FIGS. 1 to 3, and similar structures, can be manufactured in a number of ways. One approach to manufacturing such displays is to coat the electro-optic layer directly on to the backplane, where the electro-optic layer is of a type (for example, an encapsulated electrophoretic layer) which permits such coating. In most cases, this approach is not preferred since in commercial practice it requires individual processing of a large number of discrete, high value components, i.e., the individual backplanes, and this is awkward to carry out, since coating is more easily and more economically effected on a roll-to-roll basis, or at least on large flat substrates, where bar coating or hopper coating can be used, than on a large number of small separate backplanes.

In most cases, it is more convenient to coat the electro-optic layer on to a release sheet (i.e., a disposable sheet covered with a release layer). The resultant electro-optic medium/release sheet subassembly may then be laminated to a layer of lamination adhesive, coated either on to a second release sheet or on to a conductive, transparent electrode or a transparent protective layer, for example the aforementioned PET/ITO film. If the layer of lamination adhesive is an electrode or protective layer, the resulting structure is an inverted front plane laminate of the invention, so-called because it is essentially identical to the front plane laminate described in the aforementioned U.S. Pat. No. 6,982,178, but with the order of the electro-optic and lamination adhesive layers inverted.

Such an inverted FPL is then used to form a final display by removing the release sheet adjacent the electro-optic layer, and laminating the remaining layers to a backplane. If the backplane is sufficiently smooth, and close attention is paid to the lamination conditions used, good, void-free lamination should be achievable, and the resulting display will show both good low temperature performance and high resolution. If void formation (i.e., areas where the electro-optic medium fails to adhere to the backplane) is found to be a problem, the release sheet adjacent the electro-optic layer can be removed from the inverted FPL and the remaining layers laminated to a thin layer of lamination adhesive previously coated on to a separate release sheet, thus forming a modified inverted FPL containing a auxiliary layer of lamination adhesive. After removal of the release sheet covering the auxiliary adhesive layer, the modified inverted FPL can be laminated to a backplane in the same manner as previously described, with improved adhesion to the backplane. Because the surface of the electro-optic layer exposed by removal of the release sheet will be very smooth (since the electro-optic layer was coated on a smooth support), a very thin auxiliary layer (in some cases as little as 1 µm or less) of lamination adhesive will suffice in most cases. This small thickness of adhesive will not be sufficient to affect either the electro-optic performance or the resolution of the display. In fact, any thickness of the auxiliary lamination adhesive layer that is less than that of the main lamination adhesive layer should give some improvement in performance. The conductivity of the auxiliary lamination adhesive layer can be varied if desired. The thicker this auxiliary layer is, the less conductive it can be, but if it is very thin (about 1 to 10 µm) it can be substantially more conductive than the main lamination adhesive layer without compromising the performance improvements provided by the present invention.

For certain applications, it may be advantageous to have a completely symmetrical structure, with an equally thick layer of lamination adhesive on either side of the electro-optic layer. This structure should have an effectively identical symmetrical electrical response, which might be expected to reduce or eliminate certain kinds of electro-optical artifacts. Such a display structure may be produced using a symmetrical double release film as described in the aforementioned 2004/0155857.

Alternatively, the electro-optic layer/release sheet subassembly previously described may be laminated to a layer of lamination adhesive coated on a second release sheet, thereby providing a structure (in effect, a modified double release film) comprising, in order, a first release sheet, an electro-optic layer, a lamination adhesive layer and a second release sheet. It has been shown to be possible to remove either release sheet from this modified double release film as a matter of choice. The modified double release film is effectively the equivalent of a free-standing electro-optic layer, which can be used to construct devices in several ways as described in the aforementioned U.S. Pat. No. 7,110,164.

This invention may be especially useful in flexible color displays. Although considerable progress has been made in recent years in the production of flexible backplanes, including flexible thin film transistor (TFT) backplanes, substantial difficulties still remain in the areas of producing flexible color filter arrays (CFA's), aligning the pixel electrodes with the CFA elements during assembly of the displays, and maintaining this alignment when the display is flexed during use.

More specifically, one significant area of challenge in producing flexible color displays is in creating the CFA itself. The use of flexible, transparent substrates usually requires low process temperatures, which can be a problem when a CFA is produced using conventional photoresists. Lack of dimensional stability during processing makes alignment and registration over large areas difficult, and substrate non-uniformity adds to these problems.

Using a colored lamination adhesive layer as a CFA in accordance with the present invention provides several advantages. When dyes are used to provide the colors in the CFA, the dyes can be incorporated into the lamination adhesive polymer, which may be a water-borne polymer latex or a solvent-borne polymer used as a lamination adhesive. A dye of appropriate solubility must be chosen for the lamination adhesive that is to be used. Pigments may also be used to color the lamination adhesive. A water- or oil-dispersible pigment should be chosen appropriate for the lamination adhesive to be used. Pigments have the advantage of not making a major contribution to the dielectric or conductivity properties of the lamination adhesive, and they are not mobile in the lamination adhesive, whereas some dyes are mobile.

It is desirable that the colored lamination adhesive layer be thin (typically 10-50 µm) to reduce the voltage drop across the lamination adhesive layer and hence the driving voltage needed by the display. In such a thin lamination adhesive layer, it may be difficult to obtain sufficient extinction using a dye, because of limited solubility of the dye in water or a solvent. Hence, it may in many cases by preferable to use very finely divided pigments (particle size typically 5-50 nm) to allow a thin lamination adhesive layer to have high extinction yet remain light-transmissive.

As already mentioned, during the manufacture of a color display of the present invention, the lamination adhesive can be applied directly to the exposed surface of an electro-optic layer previously coated on a support, or the lamination adhesive can be applied to a separate substrate (which can be a release sheet or an electrode) and the resultant subassembly laminated to the electro-optic layer. This offers a low-cost way of creating an inverted front plane laminate comprising an integral CFA. Using such an FPL with an integral CFA expands the range of materials available for the front substrate, which can now use essentially any light-transmissive conductive layer or protective layer (formed from glass, plastic or other materials), and does not require the ability to be colored to form a CFA. Use of an inverted FPL with an integral CFA also expands the available range of backplane materials. Furthermore, because the CFA is constructed within the lamination adhesive layer, it is inherently flexible, and having the CFA intimately laminated to the electro-optic layer reduces misalignment issues that may occur when the display is flexed in use.

A single-color form of the display of the present invention can be created using an unpatterned colored lamination adhesive and lamination and assembly strategies as set out above.

A variety of methods can be used to apply, coat and/or color the lamination adhesive to form a CFA therein; the method chosen may vary with the size of the individual colored elements of the CFA. For example, the lamination adhesive may be deposited by screen printing; a colored polymer latex can be formed having the proper rheology and wetting characteristics to allow it to be printed by silk screen type methods. Alternatively, the lamination adhesive may be deposited by offset printing; a colored polymer latex can be formed having the proper rheology and wetting characteristics to allow it to be offset printed. Since offset printing is normally effected on webs (as, for example, in newspaper production), offset printing should allow the creation, at low cost, of sheets of lamination adhesive with an integral CFA ready for lamination to an electro-optic layer. Micro-contact printing may also be used; a colored polymer latex can be formed having the proper rheology and wetting characteristics to allow the fluid to be micro-contact printed.

A lamination adhesive layer with integral CFA may also be formed by ink jet or bubble jet printing of a color lamination adhesive. Most ink jet and bubble jet printers apply aqueous colored fluid to a printing substrate, using small droplets (typically about 10 µm in diameter) of the colored fluid. As discussed in several of the aforementioned E Ink and MIT patents and applications, polyurethane latices are often used as lamination adhesives in electro-optic displays, and the particles in such a latex at typically of the order of 100 nm in diameter, and hence very small relative to ink jet droplets. Thus, such latices are entirely compatible with ink jet and bubble jet printing. Pigment particles of the order of 10 nm in diameter can also readily be carried in ink jet or bubble jet droplets if properly suspended, while dyes and solvated polymers can easily be carried in such droplets. Finally, it should be noted that ink jet and bubble jet printing are low temperature processes, and thus pose a low risk of dimensional stability problems when used to effect patterning on plastic substrates.

A lamination adhesive layer with integral CFA may also be formed by ink jet or bubble jet printing of a dye on to a preformed layer of a lamination adhesive. Depending on the type of dye used, it may be possible for the dye to be printed on and/or diffuse into the lamination adhesive layer. The effect that the ink jet fluid has on the electrical properties of the lamination adhesive and its lamination characteristics should be taken into consideration.

A lamination adhesive layer with integral CFA may also be formed by a resist process. If the lamination adhesive is curable (cross-linkable) in a local area, a difference in solubility to common solvents can be created to allow patterning. For example, polyurethane-polyacrylate latices are known which can be cured with ultraviolet or visible radiation. Such materials can be cured with a laser, or via a photomask or other process to form a rubbery material that it not easily dissolved. Unexposed areas of the polymer can then be washed away, and the operation repeated to form the various colored elements of the CFA sequentially. Depending on the characteristics of the lamination adhesive, the flatness of the electro-optic layer, and the degree of curing, this patterning could be done on a release sheet to form the CFA as a separate subassembly before lamination of the CFA to the electro-optic layer. Alternatively, the patterning could effected directly on the electro-optic layer if the process conditions required are compatible with the electro-optic layer. If it is possible to create sufficiently high temperatures in a local area without damage to other components of the display, thermal curing could be used in place of radiation curing.

The patterning need not be limited to a CFA sub-pixel array. The lamination adhesive could be patterned as if it were a color overlay graphic (for example, via screen printing) and laminated directly to the optical layer.

Additives other than coloring materials can usefully be incorporated into the lamination adhesive layer used in the display of the present invention. For example, ultraviolet absorbing compounds (for example, Tinuvin-Registered Trade Mark) can be incorporated into the lamination adhesive to protect the electro-optic layer from ultraviolet exposure. Such incorporation of an ultraviolet absorber into the lamination adhesive may eliminate the need for an ultraviolet filter layer to be applied to the front protective layer of a display. Similarly, a diffusing layer can be created by incorporating a light-scattering or diffracting material (for example, glass beads) into the lamination adhesive, thus creating a display with a matte appearance.

Regardless of the exact method used to form the lamination adhesive with integral CFA, it is necessary to register the colored elements of the CFA with the pixel electrodes of the backplane. This can be accomplished by placing alignment marks on the CFA side during the printing process or creating such marks afterwards using an optical registration mechanism.

The present invention has the advantage that forming a color filter array in a lamination adhesive layer disposed between the electro-optic layer and the viewing surface of the display places the color filter array close to the electro-optic layer, thus minimizing parallax problems. The color filter array is also provided in a flexible polymer layer already present in the display. Alignment of the color filter array with the backplane electrodes is easily effected and, in the case of flexible displays, maintained as the display is flexed in use. The choice of material for the front protective and similar layers is expanded, since this layer does not need to be capable of incorporating or supporting a color filter array. Methods are available for patterning the color filter array at a variety of resolutions, depending upon performance and cost requirements. Some of these methods can be carried out on continuous webs of material and can create an inexpensive front plane laminate with an integral color filter array. Additional additives, such as ultraviolet absorbers, can be incorporated into the lamination adhesive layer, thus simplifying the requirements for other layers of the display. For certain applications requiring a single color, the use of a colored lamination adhesive is an inexpensive way to offer a wide variety of colors.

The question of providing ultraviolet absorbers (filters) in the displays of the present invention, and in similar electro-optic displays, especially thin flexible electro-optic displays, deserves further consideration, since a variety of types of electro-optic media are sensitive to ultraviolet radiation. There are three basic approaches to providing the necessary ultraviolet absorbing layer. In the first approach, an ultraviolet absorbing dye is incorporated into a polymeric layer which forms the protective layer (front substrate) of the display. In the second approach an ultraviolet absorbing material is coated as a separate layer on to one (or possibly both) surfaces of the front substrate. Such ultraviolet absorbing coatings are well known in the display industry and hence it is well within the level of skill in the art to provide such coatings on the polymeric films typically used as front substrates in the present displays. Since the surface of the front substrate facing the electro-optic layer will typically carry an ITO or similar electrode, it may be preferable to coat the ultraviolet absorber on the other (normally exposed) surface of the front substrate. In the third approach, the ultraviolet absorber is included in an adhesive layer. Incorporation of the absorber in the front adhesive layer has already been described. However, in many cases the front substrate used in the present displays may be a complex multilayer structure which needs to be assembled via at least one lamination operation using a lamination adhesive and it may be more convenient to include the ultraviolet absorber into the lamination adhesive used to assembly such a multi-layer front substrate.

As will readily be apparent to those skilled in the technology of electro-optic displays, the displays of the present invention, whether monochrome or colored, may incorporate any of the optional features of prior art electro-optic displays described in the aforementioned U.S. Pat. Nos. 6,982,178 and 7,110,164 and Publication No. 2004/0155857. Thus, for example, the displays and inverted front plane laminates of the present invention may incorporate any of the various conductive vias, edge seals, protective layers and other optional features described in these published applications.

It has been found that the electro-optic performance of displays produced from the prior art FPL's and from the inverted FPL's of the present invention are similar, despite the fact that the latter displays have an additional layer (the lamination adhesive layer) between the electro-optic layer and the viewing surface of the display. The following Examples are given, though by way of illustration only to illustrate the various aspects of the present invention and the improvements in performance which can be achieved in displays of the present invention.

Example 1

Production of Experimental Displays

A slurry containing electrophoretic capsules in a polymeric binder was prepared substantially as described in U.S. Patent Publication No. 2002/0180687, Paragraphs [0067] to [0074], except that Dow Corning Q2-521 "Super Wetting Agent" was added as a coating aid. The slurry was then bar-coated on to the aluminum-coated surface of an aluminized PET release sheet. In one procedure, a 20 µm layer of a lamination adhesive had previously been coated on to the same aluminized surface; this lamination adhesive was of the type described in U.S. Pat. No. 7,012,735, and was doped with 20,000 ppm of tetrabutylammonium hexafluorophosphate. In a second procedure, the same 20 µm layer of the same lamination adhesive was laminated to the ITO-covered surface of a PET/ITO release sheet, and the resultant sub-assembly laminated to the electrophoretic layer/release sheet subassembly, the adhesive layer being laminated to the electrophoretic layer.

The lamination adhesive used was known to give relatively good low temperature performance, but to give displays with poor room temperature resolution.

The two structures produced as described above were when used to make several different kinds of displays by three differing procedures, as follows:

1. The release layer covering the electrophoretic layer was removed, and the remaining layers (PET/ITO/lamination adhesive/electrophoretic layer) were laminated to a second layer of the same lamination adhesive on a further release sheet to give a substantially symmetrical structure with the electrophoretic layer disposed between two similar lamination adhesive layers. The further release sheet was then removed from the second lamination layer, and the remaining layers laminated to a 2 inch (51 mm) square carbon black coated backplane to give a functioning experimental single pixel electrophoretic display, designated "FPL1".

2. It was found that, with some care, the release layers on the double-release structure could be peeled from either side. If the release sheet covering the electrophoretic layer was removed, the remaining layers could (surprisingly) be laminated directly to ITO on a polymeric film to give a structure (designated "FPLnorm" identical to prior art, not inverted, FPL.

3. Alternatively, after removal of the release sheet covering the electrophoretic layer, the remaining layers could be laminated to a second layer of the same lamination adhesive on a further release sheet to give a second substantially symmetrical structure, differing from the symmetrical structure produced by Procedure 1 only in which side of the electrophoretic layer was smooth, the smooth surface being of course that adjacent the coating support. The release layers on either side of the resultant structure could be peeled and the remaining layers laminated to the ITO-covered surface of an ITO/PET film to give either one of two related front plane laminates, designated "FPL1'", which was identical in structure to the aforementioned FPL1, and "FPL1''", with the electrophoretic layer inverted relative to FPL1 and FPL1'.

Each of FPLnorm, FPL1, FPL1' and FPL1" was laminated to a carbon backplane in the manner already described to give an experimental single pixel electrophoretic display. (Note that the surface of the carbon black backplane was sufficiently rough to preclude preparation of an inverted structure of the present invention with no lamination adhesive layer between the electrophoretic layer and the backplane.) Similar experimental displays were also produced using ITO-on-glass backplanes to allow testing of resolution as described in Example 3 below, but in this case a true inverted structure was provided since the ITO-on-glass backplane was sufficiently smooth to allow lamination of the electrophoretic layer with no intermediate lamination adhesive. All displays were incubated at 30 percent relative humidity for 5 days before the electro-optic testing described in Example 2 below.

The Table below summarizes the structures produced on the carbon black backplanes; in this Table, "BP" denotes the backplane, "LA" a lamination adhesive layer and "ELP" the electrophoretic (capsule-containing) layer:

TABLE

| Code | Structure | Remarks |
|---|---|---|
| Control | BP/LA/ELP/ITO | Slurry coated on ITO, made into FPL |
| FPLnorm | BP/LA/ELP/ITO | Made from electrophoretic layer on release as described above |
| FPL1 | BP/LA/(smooth)ELP/LA/ITO; ITO lam 1st | Symmetrical structure, with smooth side of the electrophoretic layer toward backplane |
| FPL1' | BP/LA/(smooth)ELP/LA/ITO; Release lam 1st | Symmetrical structure, with smooth side of the electrophoretic layer toward backplane; differs in order of lamination from FPL1 |
| FPL1" | BP/LA/ELP(smooth)/LA/ITO; Release lam 1st | Symmetrical structure, viewed from rough electrophoretic layer side, made by lamination to adhesive on release, removing "rough" side release, and laminating to ITO/PET |

Example 2

Electro-Optic Tests

Figure 4:
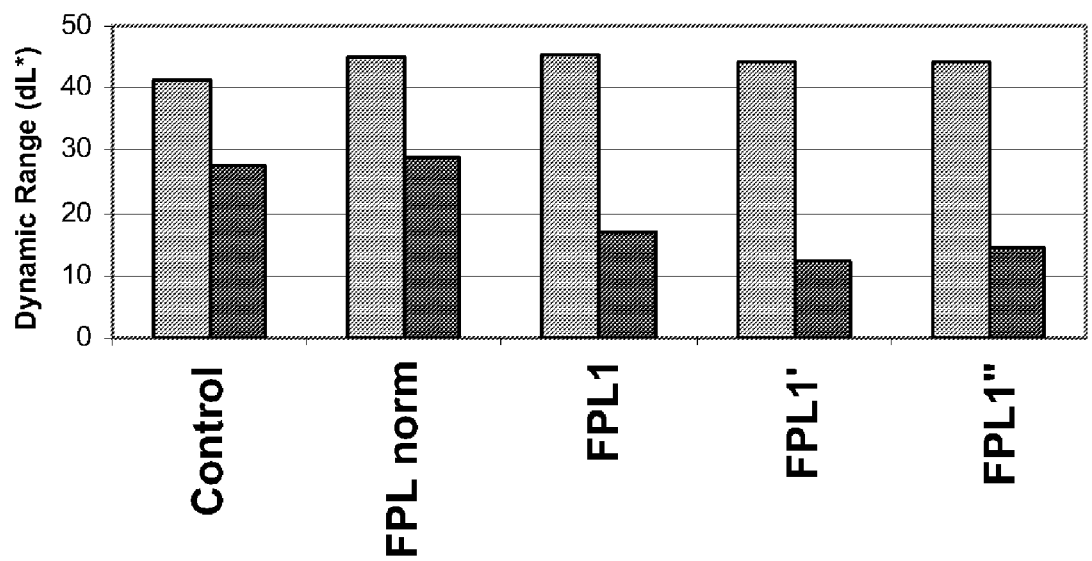
FIG. 4 is a bar graph showing the dynamic ranges measured in Example 2 below.

The experimental displays prepared in Example 1 above were driven between their extreme black and white optical states using ±15 V, 500 millisecond drive pulses and the reflectivities of the two extreme optical states measured. Testing was effected both at room temperature (20° C.) and at 0° C. FIG. 4 of the accompanying drawings shows the dynamic range (the difference between the extreme black and white states measured in L* units (where L* has the usual CIE definition:

$$L^* = 116(R/R_0)^{1/3} - 16,$$

where R is the reflectance and $R_0$ is a standard reflectance value). In each case, the left column shows the results obtained at 20° C., while the right column shows the results obtained at 0° C.

From FIG. 4 it will be seen that the control and the "inverted" structure of the present invention (the two pairs of columns at the left-hand side of FIG. 4, the inverted layer being inverted in the sense that the electrophoretic layer is inverted) show very similar results at both 20° C. and 0° C. The symmetrical structures also show similar performance at 20° C. but show poorer performance at the lower temperature because of the second layer of lamination adhesive.

Kickback or self-erasing (a movement of the optical state away from the extreme optical state following the end of the drive pulse) and dwell time dependency (the variation of one extreme optical state depending upon the period for which the pixel has remained in the opposite extreme optical state before the transition to the one extreme optical state) were similar for all the experimental displays.

Example 3

Resolution

Figure 5:
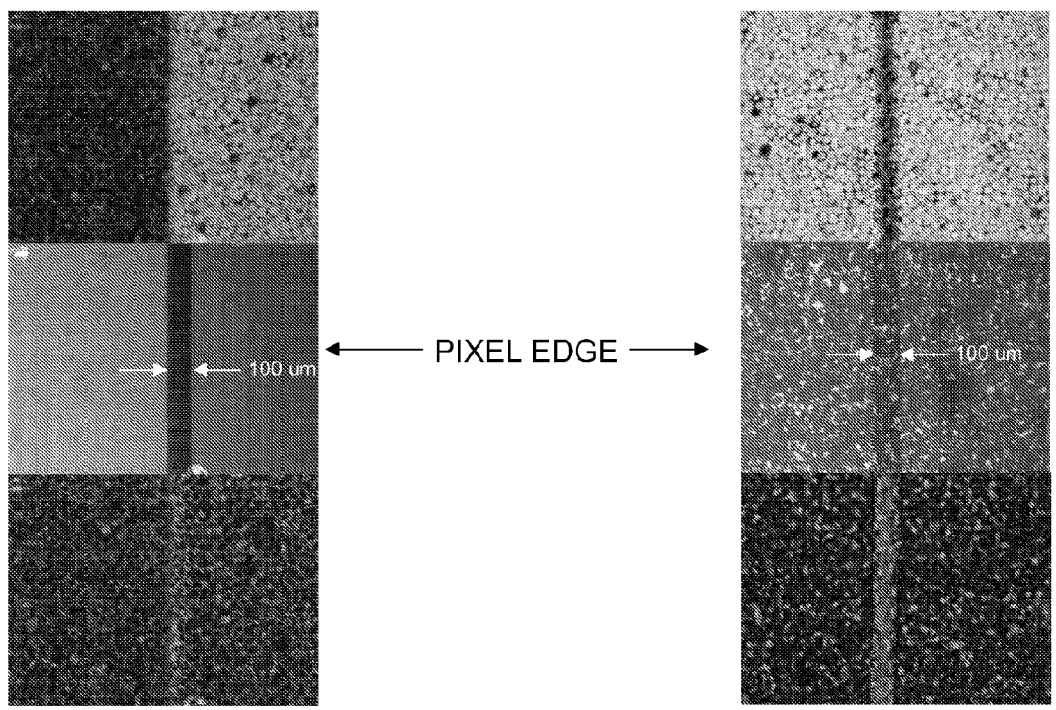
FIG. 5 is a photograph of the displays used in the resolution tests carried out in Example 3 below.

The resolution of the control displays and those of the present invention was evaluated by microscopic examination of the displays formed on glass backplanes; FIG. 5 shows the differences that were observed. As indicated in FIG. 5, each of the displays used in these tests comprised two pixels separated by a 100 μm gap having no ITO layer and hence non-switching. The control display (conventional FPL structure) is shown on the left-hand side of FIG. 5 and the display of the present invention on the right-hand side. Each side of FIG. 5 is a composite of three separate micrographs of the relevant display. The upper section of FIG. 5 shows the display with the right pixel switched to its white extreme optical state, while the lower section of FIG. 5 shows the display with the right pixel switched to its black extreme optical state.

It can be seen from FIG. 5 that, in the control display, blooming caused switching across the entire width of the inter-pixel gap, i.e., the blooming is at least 100 μm. On the other hand, in the inverted FPL display of the present invention, blooming is less than one capsule width (less that 20 μm) and the inter-pixel gap is clearly visible in both the upper and lower portions of FIG. 5.

These results illustrate the substantial advantage in resolution which can be achieved by using the inverted FPL structure of the present invention, while maintaining the low temperature electro-optic response of the display. Thus, the present invention allows both good room temperature resolution and good low temperature performance to be obtained from the same display, thus avoiding the compromise between these two performance parameters required in prior art displays.

Numerous changes and modifications can be made in the preferred embodiments of the present invention already described without departing from the scope of the invention. For example, although the displays of the present invention shown in FIGS. 2 and 3 use red/green/blue color filter arrays, the displays of the invention may also use cyan/magenta/yellow or red/green/blue/white color filter arrays. Accordingly, the foregoing description is to be construed in an illustrative and not in a limitative sense.

The invention claimed is:

1. An article of manufacture comprising, in this order:
a release sheet;
a layer of a solid electro-optic medium;
an adhesive layer; and
at least one of a light-transmissive protective layer and a light-transmissive electrically-conductive layer,
the article of manufacture further comprising an auxiliary adhesive layer interposed between the release sheet and the electro-optic layer, the auxiliary adhesive layer having a thickness not greater than about 10 μm.

2. An article of manufacture according to claim 1 wherein the adhesive layer comprises a least two sections having differing colors.

3. An article of manufacture according to claim 2 wherein the adhesive layer has sections having at least three different colors.

4. An article of manufacture according to claim 3 wherein the adhesive layer has yellow, cyan and magenta, or red, green and blue, or red, green, blue and clear sections.

5. An article of manufacture according to claim 2 wherein the adhesive layer is colored using at least one pigment.

6. An article of manufacture according to claim 5 wherein the pigment has an average particle size in the range of about 5 to about 50 nm.

7. An article of manufacture according to claim 1 wherein the adhesive layer comprises at least one of an ultra-violet absorber and a light-scattering or light-diffusing material.

8. An article of manufacture according to claim 1 comprising both a light-transmissive protective layer and a light-transmissive electrically-conductive layer, the electrically-conductive layer being disposed between the protective layer and the adhesive layer.

9. An article of manufacture according to claim 1 wherein the electro-optic medium comprises an electrochromic or rotating bichromal member medium.

10. An article of manufacture according to claim 1 wherein the electro-optic medium comprises an electrophoretic medium having a plurality of electrically charged particles disposed in a fluid and capable of moving through the fluid on application of an electric field to the electro-optic medium.

11. An article of manufacture according to claim 10 wherein the electrically charged particles and the fluid are encapsulated within a plurality of capsules or cells.

12. An article of manufacture according to claim 10 wherein the electrically charged particles and the fluid are present as a plurality of discrete droplets held within a polymeric continuous phase.

13. An article of manufacture according to claim 10 in which the fluid is gaseous.

14. An article of manufacture comprising, in this order:
a release sheet;
a layer of a solid electro-optic medium;
an adhesive layer; and
at least one of a light-transmissive protective layer and a light-transmissive electrically-conductive layer,
the article of manufacture further comprising an auxiliary adhesive layer interposed between the release sheet and the electro-optic layer, the auxiliary adhesive layer having a thickness not greater than about one half of the thickness of the adhesive layer on the opposed side of the electro-optic layer.

15. An article of manufacture according to claim 14 wherein the adhesive layer comprises a least two sections having differing colors.

16. An article of manufacture according to claim 15 wherein the adhesive layer has sections having at least three different colors.

17. An article of manufacture according to claim 16 wherein the adhesive layer has yellow, cyan and magenta, or red, green and blue, or red, green, blue and clear sections.

18. An article of manufacture according to claim 15 wherein the adhesive layer is colored using at least one pigment.

19. An article of manufacture according to claim 18 wherein the pigment has an average particle size in the range of about 5 to about 50 nm.

20. An article of manufacture according to claim 14 wherein the adhesive layer comprises at least one of an ultra-violet absorber and a light-scattering or light-diffusing material.

21. An article of manufacture according to claim 14 comprising both a light-transmissive protective layer and a light-transmissive electrically-conductive layer, the electrically-conductive layer being disposed between the protective layer and the adhesive layer.

22. An article of manufacture according to claim 14 wherein the electro-optic medium comprises an electrochromic or rotating bichromal member medium.

23. An article of manufacture according to claim 14 wherein the electro-optic medium comprises an electrophoretic medium having a plurality of electrically charged particles disposed in a fluid and capable of moving through the fluid on application of an electric field to the electro-optic medium.

24. An article of manufacture according to claim 23 wherein the electrically charged particles and the fluid are encapsulated within a plurality of capsules or cells.

25. An article of manufacture according to claim 23 wherein the electrically charged particles and the fluid are present as a plurality of discrete droplets held within a polymeric continuous phase.

26. An article of manufacture according to claim 23 in which the fluid is gaseous.

* * * * *